Aug. 1, 1967 G. K. HURLBUT 3,333,491

SHIELDED WIRE STRIPPING TOOL

Filed June 16, 1966 4 Sheets-Sheet 1

INVENTOR
GORDON K. HURLBUT
BY *Frederick E. Bartholy*
ATTORNEY

Aug. 1, 1967 G. K. HURLBUT 3,333,491

SHIELDED WIRE STRIPPING TOOL

Filed June 16, 1966 4 Sheets-Sheet 2

INVENTOR
GORDON K. HURLBUT

BY [signature]

ATTORNEY

Aug. 1, 1967 G. K. HURLBUT 3,333,491
SHIELDED WIRE STRIPPING TOOL
Filed June 16, 1966 4 Sheets-Sheet 3
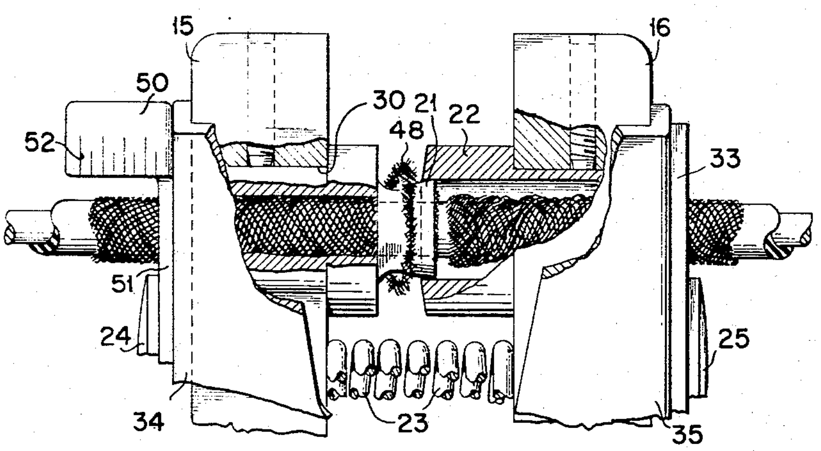
FIG.7
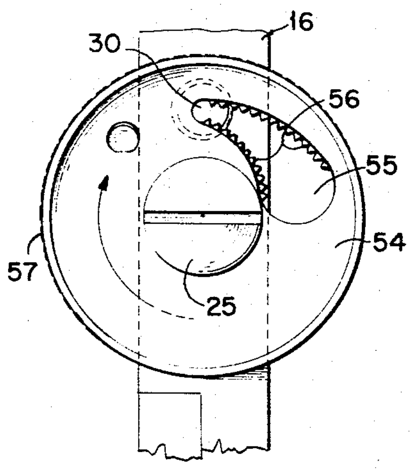
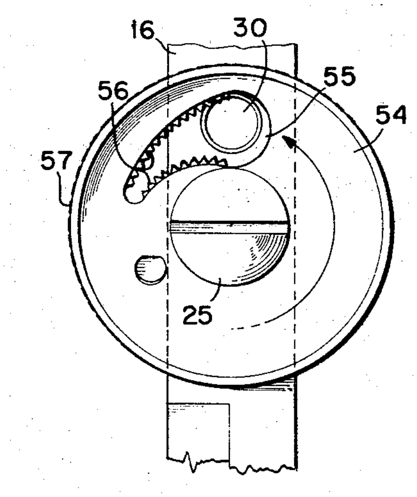
FIG. 8 FIG.9
*INVENTOR*
GORDON K. HURLBUT
BY Frederick E. Bartlett
*ATTORNEY*

SHIELDED WIRE STRIPPING TOOL

INVENTOR
GORDON K. HURLBUT
BY [signature]
ATTORNEY

United States Patent Office 3,333,491

Patented Aug. 1, 1967

3,333,491

SHIELDED WIRE STRIPPING TOOL

Gordon K. Hurlbut, Binghamton, N.Y., assignor to Gagne Associates, Inc., Binghamton, N.Y., a corporation of New York Filed June 16, 1966, Ser. No. 557,959
3 Claims. (Cl. 81—9.5)

ABSTRACT OF THE DISCLOSURE

A plier-type hand tool for stripping shielded braid from insulated conductors in which each jaw carries a portion of an interfitting die punch. A circular channel through the jaws and the punch permits insertion of the shielded wire to be stripped. Manually operated lever arms have cutouts which, when the arms are actuated, are placed concentric with the channel for allowing the conductor to pass through and when released are moved to grip the conductor. Closing the jaws constrains the shielding to slip over the conductor and form a loop between interfaces of the die punch which, when closed, severs this loop.

This invention relates to a device in the form of a hand-operated tool for stripping a desired length of the shielding braid surrounding insulated wires or cables.

Shielded cables find wide application in the field of electronics and consist of a conducting element enveloped by an insulating covering. The latter is surrounded by a fine mesh of metal braid. The removal of portions of the shielding braid without disturbing the insulation covering has been difficult, due to the fact that the shielding braid, being of metal, requires considerable cutting force whereas the insulation, being of plastic or rubber, will be injured by a cutting tool exercising such force.

In my U.S. Patent 3,085,455, there is described a cable stripping apparatus which operates on the principle of folding back the shielding braid over a portion of the insulating covering so as to form a radially-extending bead or loop. The latter is then cut in the direction axial to the conductor by means of circumferentially engaging cutting edges which sever the looped braid. This apparatus is suitable for large scale production but is not intended for individual operation.

It is, therefore, the primary object of this invention to provide a hand-operated tool for stripping the shielding braid which incorporates the above-described principle of operation.

It is a further object of the invention to provide a hand-operated stripping tool in which the tension of the braid gripping elements is easily adjustable and under the control of the operator.

It is a particular feature of the invention that the stripping tool has relatively few moving parts and is simple to operate.

It is a particular advantage of the invention that the braid-actuating moving parts are readily accessible and are functionally separate from the main cutting action.

Other objects, features and advantages will be apparent from the following description of the invention, defined in particularity in the appended claims, and taken in connection with the accompanying drawings in which:

FIG. 7 is an enlarged partial view of the head assembly with portions cut away to illustrate the stripping action;

FIG. 8 is a side view of a modification utilizing a disk-type wire gripper shown in closed position;

FIG. 9 is a view similar to FIG. 8 with the disk turned into open position;

Figure 1:
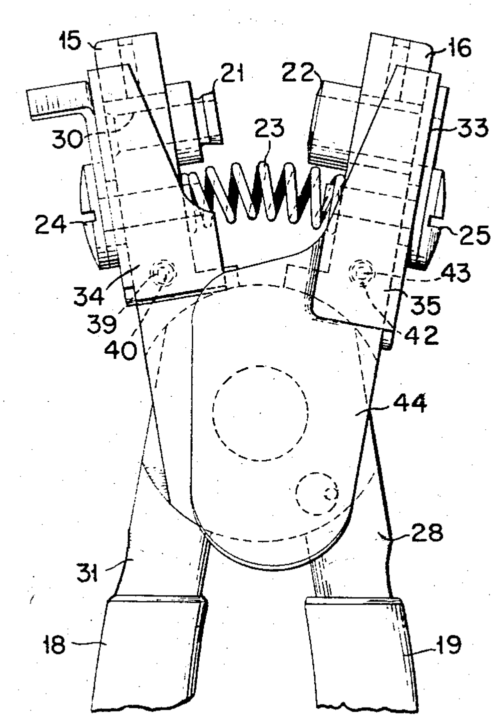
FIG. 1 is a view of the stripping tool head assembly in open position.
Figure 2:
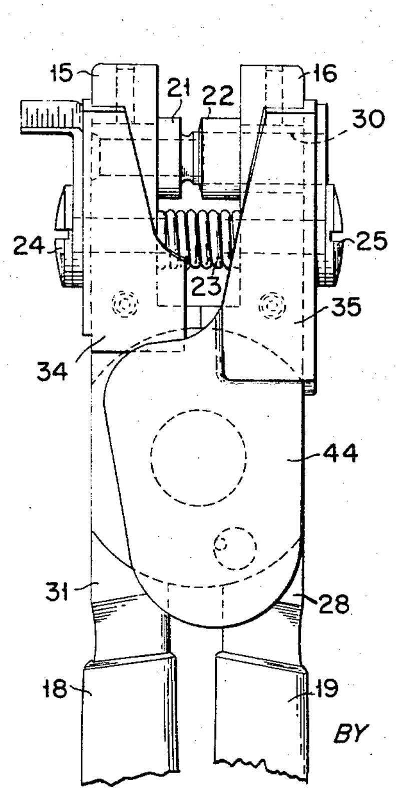
FIG. 2 is a view similar to FIG. 1 showing the head assembly in closed position.

Prior to discussing the construction shown in the various figures, a clear understanding of the problems involved is believed to be essential. In order to form a loose bead of the wire mesh or braid covering the conductor, it is necessary to grip the shielding cable at two distinct points over a portion where the shield is to be stripped. The gripping action must be firm enough to engage the braid with sufficient force to constrain it to slide over the insulation but not to press against the insulation with such force as to prevent sliding movement. When the gripping force is too strong, it will press the braid into the insulation and not only may cause injury to it but also prevents free sliding of the braid.

Attempts have been made, as seen in the prior art, to incorporate braid gripping means actuated by, and in unison with, the jaws of the stripping tool for the purpose of folding back the braid over the insulating covering of the conductor. In these embodiments, the operator has no control over the gripping force or action.

Practice has shown that such tools will operate satisfactorily only with a particular cable where the insulating covering is solid or hard enough to allow the sliding of the braid under the preset gripping force of the tool. However, where the insulating covering is more pliable or of different consistency, the gripping force may be too strong so that the wire braid is pressed into the insulation. Under these circumstances, since there is no control over the force exerted, such tools proved to be useless. Realizing the importance of maneuverability in the application of the shield-gripping force, the stripping tools herein described provide gripping action which, at least at one point, is independent from the cutting operation and is under the control of the operator.

In the various figures of the drawings, the handle portions of the stripping tool are cut away in order to save space for enlarged illustrations of the operative portions. The handles are of conventional type which are held by the operator as is the case with ordinary pliers and similar types of hand-operated tools.

Referring to the drawings, FIGS. 1 through 6 illustrate a preferred embodiment of the invention. The head assembly of the stripping tool comprises raciprocal jaws 15 and 16 which pivot over a stud 17 and are manually operated by the handles 18 and 19. The above construction is, in fact, that of a conventional pliers. The inner face of the jaw 15 is attached to the male member 21 of a die punch, and opposite therewith the female member 22 is attached to the inner face of the jaw 16. When the jaws are closed (seen in FIG. 2), the die punch members are engaged and by virtue of the shearing action effect cutting of any material which may be placed between them.

The jaws 15 and 16 are normally maintained in open position by the expansion spring 23 nested at each end over the intruding portions of bolts 24 and 25, respectively, which screw into jaws 15 and 16. The bolts 24 and 25 also form the pivotal support of the cable gripping elements of the head assembly. The extent of separation of the jaws 15 and 16 is determined by a pin 27 attached to the arm 28 and extending inwardly into a circular cutout 29 carried by the arm 31. The inner wall of the cutout engaging the pin limits the separation of the arms 28 and 31 and thus de-limits the full open position of the jaws 15 and 16 powered by the spring 23. In the closed position, full engagement is provided for the die punch members 21 and 22 prior to engagement of the limit pin 28 with the wall of the cutout 29.

The die punch members 21 and 22 are of tubular crosssection and match similar openings in the jaws 15 and 16. Together these form a cable channel 30 across the head assembly. The diameter of the opening in the jaws as well as in the die determine the overall size of the largest diameter shielded cable which the stripping tool will accommodate. In fact, in the operation, as will be seen in connection with the description of FIG. 7, the cable is inserted in the tubular channel prior to stripping and extends from each side of the head assembly.

The cable gripping members of the head assembly consist of two lever arms 34 and 35, each being pivoted over the bolts 24 and 25, respectively. The configuration of the arms is such that they overlap the sides of the jaws and have circular apertures 37 and 38 (FIGS. 3 and 6), respectively, which in open position of the lever arms are in concentric alignment with the cable channel 30.

The gripping member 34 is biased by spring 39 engaging an abutting pin 40 which touches the inner face of the arm. Similarly, the lever arm 35 is biased by the spring 42 carrying an abutting pin 43 which engages the inner face thereof. Moreover, arm 35 has a downwardly extending thumb plate 44 of oval shape overlying the end of the arm 34. In this manner, pressing down on the plate 44 moves not only the arm 35 but also constrains the arm 34 to pivot over the bolt 24. In other words, by the pressure of one finger, most conveniently the thumb, both lever arms 34 and 35 may be moved in unison. The action of this movement is seen in FIGS. 3 to 6.

Figure 3:
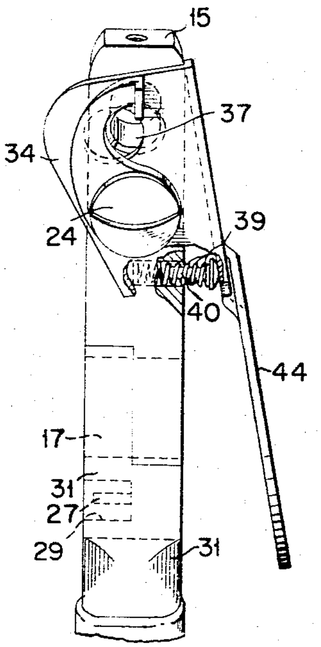
FIG. 3 is a view of the left side of the stripping tool head assembly slightly tilted with the lever arms in gripping motion.
Figure 4:
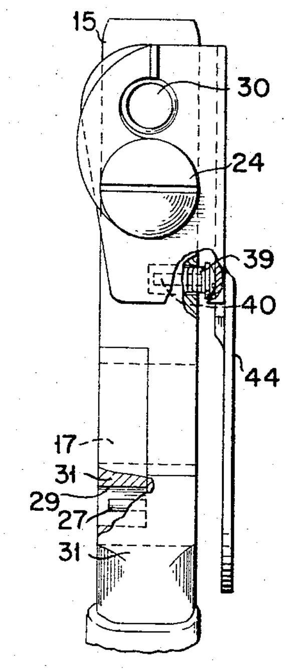
FIG. 4 is a view similar to FIG. 3 with the lever arms in depressed position.
Figure 5:
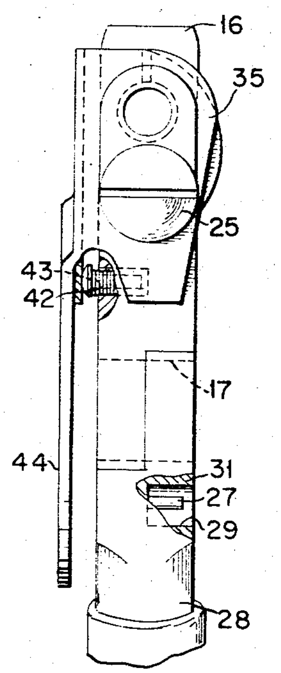
FIG. 5 is a view of the right side of the head assembly with the lever arms in depressed position.
Figure 6:
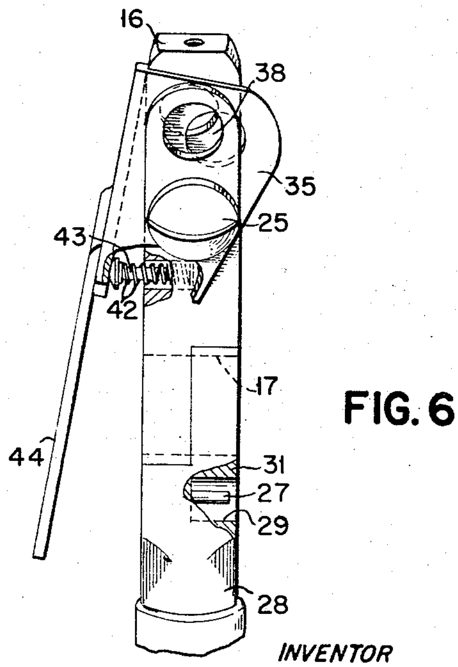
FIG. 6 is a view similar to FIG. 5, slightly tilted, with the lever arms in gripping position.

In FIGS. 3 and 6, the lever arms 34 and 35 are shown in normal or closed position held by the force of springs 39 and 42, respectively. It is seen that in this position both aperture 37 and aperture 38 are eccentric with the channel 30; whereas (as seen in FIGS. 4 and 5), when the plate 44 is depressed, the lever arms 34 and 35 are moved into open or alignment position with the channel 30 so that the apertures 37 and 38 are concentric therewith. It is important to note that the movement of the cable gripping members 34 and 35 is separate and independent from the closure or opening of the jaws 15 and 16 of the stripping tool. Both of these motions may be independently made under the control of the operator.

The jaw closing motion is effected by pressing together the handles of the tool as it is held in the hand of the operator; whereas the motion of the gripping elements is actuated by a finger of the hand. In both of these movements, the operator may vary the force needed to effect proper shield stripping.

In the embodiment shown in FIGS. 1 through 6, the gripping action of both jaws is effected by the pivotal displacement of the lever arms 34 and 35 in a direction urged by the springs 39 and 42 which place the apertures 37 and 38 eccentric to the channel 30. The force of this action may be varied by pressure on the thumb plate 44.

Considering the operation of the stripping action, the jaws 15 and 16 are first closed and the thumb plate 44 depressed so that the channel 30 is free and clear for the insertion of the shielded wire through the aperture 37 of the lever arm 34. The end of the wire should extend far enough at the other side through aperture 38 in arm 35 to allow for the length taken up by the opening of the jaws. With the thumb plate 44 still depressed, the jaws 15 and 16 are allowed to open under pressure of the spring 23. Pressure on the thumb plate 44 is now released or lessened to effect the required gripping action of the lever arms 34 and 35 which will, upon closing of the jaws 15 and 16, constrain the shielding braid to fold upon itself between the two points of contact of the gripping arms. As the jaws are progressively closed, the fold-over results in a radially-extending bead or dished-out portion of the braid. At full closure, the die punch 21 and 22 sever this portion of the braid. This action is shown in the enlarged partial view of FIG. 7. The completed cut results in a loose ring 48 of the braid material. For the convenience of determining the length desired to be cut, there is provided a gauge 50 in the form of a tab 51 pivoted around the bolt 24 having graduations 52. This tab can be manually positioned at the time the cable is inserted. When the cut is completed, the plate 44 is fully depressed so as to release the gripping action and allow the cable to be removed from the tool.

Attention is directed to the fact that the cable gripping force at the jaw 16 is of primary importance. It is at this point that the grip should be just sufficient to push back the shielding but not too strong to pinch it against the insulation covering. At the other end, namely, at the jaw 15, the force may be stronger so as to prevent movement of the braid. Consequently, at this point no delicate control need be effected and the pressure may be pre-determined and also automatically applied. The modifications shown in FIGS. 8 to 13 take this fact into consideration and provide constructions which effect retaining action automatically at the insertions point of the tool but leave the gripping action controllable at the extrusion point of the cable. Referring to FIGS. 8 and 9, the gripping element at the extrusion point comprises a disk 54 rotatably supported over the bolt 25 and having a crescent-shaped cutout, the edge of which has a series of gripping serrations 56. The cutout 55 is of such radial distance as to correspond to the distance of channel 30. The outer periphery of the disk 54 is knurled at 57 to provide a firm hold for the operator.

In FIG. 8, the disk 54 is shown for extreme closure at channel 30; whereas in FIG. 9, the disk 54 is shown turned to fully open position permitting the shielded cable to pass through. Except for the cable gripping mechanism, the stripping tools shown in FIGS. 10 to 13 are the same as that shown and described in connection with the previous figures. Consequently, features in common need not be repeated here.

Figure 10:
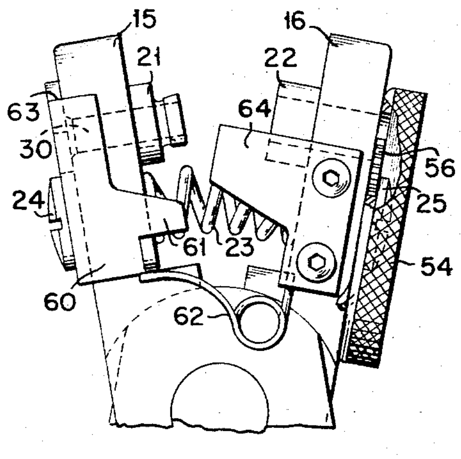
FIG. 10 is a view of a modified head assembly utilizing a sliding plate gripper shown in gripping position.
Figure 11:
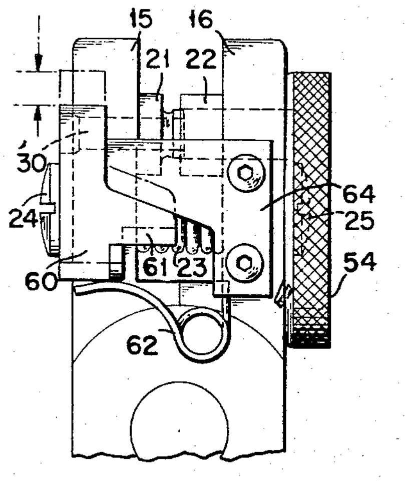
FIG. 11 is a view similar to FIG. 10 showing the head assembly in closed position.

Referring to FIGS. 10 and 11, the cable retaining or gripping element at the jaw 15 comprises a vertically sliding plate 60, held by the bolt 24 having a laterally extending cam 61. A spring 62 affixed at one end to the jaw 16 biases the plate 60 into upward position. The force of this spring determines the gripping action of the plate 60 on the braid of the shielded wire. The cam 61 is operated by a cam lever 64 attached to the jaw 16. The cable gripping means at the jaw 16 comprises the manually operable disk 54 of the type shown in FIGS. 8 and 9.

It is seen that in the fully open position of the stripping tool, the plate 60 is entirely under the control of the pressure exerted by the spring 62 and is in fully upward position; whereas when the jaws 15 and 16 are closed as shown in FIG. 11, the cam lever 64 engaging the cam 61 constrains the plate 60 to move downwardly so as to place the edge 63 below the cable channel 30. It is to be noted that engagement of the cam lever 64 takes place only after nearly complete closure of jaws 15 and 16 so that gripping action of the plate 60 is maintained during progressive closure of the jaws 15 and 16.

In operation, in essence, is the same as previously described. With the jaws completely closed and the disk 54 moved into position as shown in FIG. 9, a shielded cable may be inserted into the channel 30. As the jaws 15 and 16 are opened, the plate 60, at its grooved edge 63, firmly grips the shielded cable. The force of this is sufficiently strong to prevent any sliding of the shielding braid. On the other hand, the disk 54, prior to closure of the jaws, is turned to such an extent that the serrations 56 engage the shielding braid with just sufficient force to permit its sliding over the insulation covering of the cable. As the jaws 15 and 16 are closed, the shielding braid will be folded back as previously described and cut by the die punch 21 and 22. At the time this cut is effected, the jaws are fully closed so that the plate 60 no longer engages the cable and it may be removed with a portion of the shielding stripped therefrom.

Figure 12:
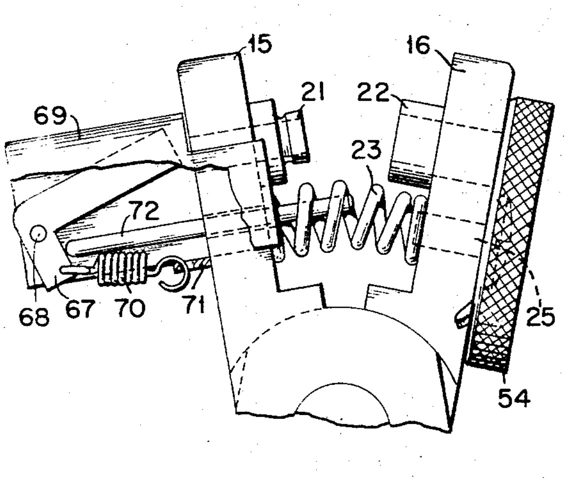
FIG. 12 is a view of another modification of the head assembly utilizing a swinging bar gripper shown in gripping position.
Figure 13:
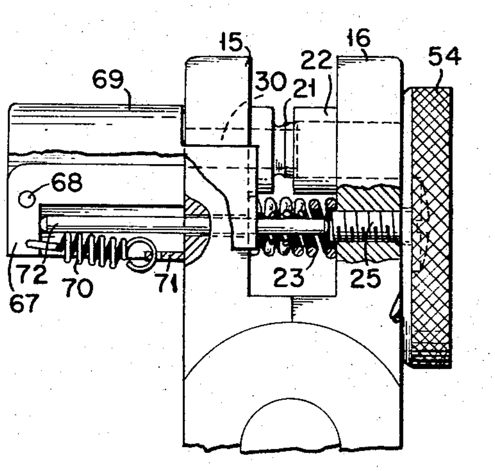
FIG. 13 is a view similar to FIG. 12 showing the head assembly in closed position.

An alternate type of construction is shown in FIGS. 12 and 13. The gripping element at the jaw 15 is in the form of a bell crank 67 pivoted at 68 in an extension 69 attached to the jaw 15. Spring 70 attached to the stud 71 in the jaw 16 is hooked to the lower arm 71 of the bell crank 67. A pin 72 extending through the jaw 15 abuts against the arm 71 at one end and, at the other end, engages the intruding portion of the bolt 25 and is actuated thereby upon closure of the jaws 15 and 16. The pin 72 thus moves the bell crank into downward position allowing free access to the cable channel 30.

The operation is similar to that above described. The gripping action of the bell crank 67 is determined by the force of the spring 70 and is sufficient to prevent any sliding of the braid of the shielded cable. This action is automatic, being operable by the opening and closing of the jaws 15 and 16. However, the gripping action at the sliding end remains under control of the operator, being determined by the extent of displacement of the disk 54. This is a particular advantage inasmuch as the gripping force in excess of that which will permit sliding of the braid would prevent successful operation as is the case in devices where both cable gripping elements are automatically operated.

What is claimed is:

1. In a device for stripping the shielding braid covering of shielded cables, a head assembly comprising a pair of pivoted reciprocating jaws having handles for manual operation, spring means for biasing said jaws in open position, a die punch comprising a pair of interengaging members of tubular cross section, one of said members being attached to the inner face of one jaw and the other to the inner face of the other jaw, said members upon closing of said jaws effecting shearing of material placed therebetween, a tubular channel extending through said jaws and concentric with said die punch members for accepting therewithin a length of shielded conductor, gripping members comprising lever arms pivoted at the side of said assembly, each of said arms having a portion folded over the outer side of corresponding jaws and having a cutout substantially of the same diameter as said tubular channel, spring biasing means for said arms for causing pivotal movement placing said cutout eccentric to said channel, thereby gripping the outer periphery of a length of shielded cable, one of said lever arms having a thumb plate overlapping the other of said arms for simultaneous manual control of the actuation of said arms.

2. A device in accordance with claim 1 wherein one of said gripping members comprises a disk rotatably supported at the outer side of one of said jaws, said disk having a crescent-shaped cutout in alignment with said channel and the other of said gripping members comprising a plate slideably supported at the outer side of the other of said jaws, said plate having a curved edge in shearing alignment with said channel, and a cam, spring means biasing said plate member into gripping engagement upon opening position of said jaws and cam lever means supported on the other of said jaws for engaging said cam and urging said plate member downwardly into disengaging position upon closing motion of said jaws.

3. A device in accordance with claim 1 wherein one of said gripping members comprises a disk rotatably supported at the outer side of one of said jaws, said disk having a crescent-shaped cutout in alignment with said channel and the other of said gripping members comprising a bell crank pivoted in a support at the outer side of the other of said jaws, said bell crank having an arm in alignment with said channel, spring means biasing said bell crank into gripping engagement upon opening position of said jaws and a pin slideably arranged in one of said jaws and actuated by the movement of the other of said jaws for pivoting said bell crank downwardly into disengaging position upon closing motion of said jaws.

References Cited

UNITED STATES PATENTS

| | | | |
|---|---|---|---|
| 3,044,333 | 7/1962 | Broske | 81—9.5 |
| 3,139,778 | 7/1964 | Bielinski et al. | 81—9.51 |
| 3,153,358 | 10/1964 | Havens | 81—9.51 |
| 3,234,825 | 2/1966 | Erickson | 81—9.5 |

WILLIAM FELDMAN, *Primary Examiner.*

MILTON S. MEHR, *Examiner.*